United States Patent [19]
Jeong

[11] Patent Number: 5,813,694
[45] Date of Patent: Sep. 29, 1998

[54] HYBRID AIR BAG SYSTEM HAVING AN IMPROVED HYBRID INFLATOR

[75] Inventor: Jae-Ho Jeong, Seoul, Rep. of Korea

[73] Assignee: Daewoo Electronic Co., Ltd., Seoul, Rep. of Korea

[21] Appl. No.: 703,908

[22] Filed: Aug. 27, 1996

[30] Foreign Application Priority Data

Aug. 31, 1995 [KR] Rep. of Korea .................. 1995-27829

[51] Int. Cl.⁶ ................................................. B60R 21/26
[52] U.S. Cl. ........................................... 280/737; 280/741
[58] Field of Search .................................. 280/736, 737, 280/741, 742

[56] References Cited

U.S. PATENT DOCUMENTS

| | | | |
|---|---|---|---|
| 5,066,038 | 11/1991 | Frantom et al. | 280/737 |
| 5,199,740 | 4/1993 | Frantom et al. | 280/736 |
| 5,378,018 | 1/1995 | Ketterer et al. | 280/737 |
| 5,423,570 | 6/1995 | Kort et al. | 280/736 |
| 5,516,147 | 5/1996 | Clark et al. | 280/737 |
| 5,536,039 | 7/1996 | Cuevas | 280/737 |
| 5,584,505 | 12/1996 | O'Loughlin et al. | 280/737 |

FOREIGN PATENT DOCUMENTS 621160  10/1994  European Pat. Off. .

*Primary Examiner*—Kenneth R. Rice
*Attorney, Agent, or Firm*—Beveridge, DeGrandi, Weilacher & Young LLP

[57] ABSTRACT

A hybrid air bag system which has a simple internal structure and can be manufactured at a low cost is disclosed. The hybrid inflator is positioned within a first container. The first container is composed of a rupturable cover and a bottom plate. The hybrid inflator has a second container defining a first chamber. The first chamber is filled with a quantity of compressed gas, and then is sealed. A pyrotechnic heater of the hybrid inflator contains a pyrotechnic charge and a squib therein. The pyrotechnic heater generates high temperature combustion products by burning a pyrotechnic charge contained within a second chamber, a booster charge, and a gas generating material contained within a third chamber. Combustion products push upwardly against a lower end surface of an operation pin which is elastically supported by a plate spring and is slidable and vertically positioned within a fourth chamber. Then, the operation pin ruptures a burst disk sealing the first chamber. As a result, the compressed gas stored in the second container and the combustion products are united and then injected into an inflatable air bag to instantaneously inflate the air bag. As a result, a passenger in a motor vehicle can be protected from colliding with a structural part of the motor vehicle by the inflated air bag.

30 Claims, 10 Drawing Sheets

HYBRID AIR BAG SYSTEM HAVING AN IMPROVED HYBRID INFLATOR

BACKGROUND OF THE INVENTION

1. Field of the Invention

The present invention relates to a hybrid air bag system having an improved hybrid inflator, and more particularly to a hybrid air bag system which has a simple internal structure and can be manufactured at a low cost.

2. Description of the Prior Art

A variety of air bag apparatuses for motor vehicles have been proposed hitherto. A conventional air bag apparatus for a motor vehicle generally includes an inflatable air bag and a collision sensor for sensing a collision of the motor vehicle to generate a collision sensing signal. Also, the conventional air bag apparatus includes an electronic control unit (hereinafter referred to as "ECU") for receiving the collision sensing signal from the collision sensor to control the operation of the air bag, and an inflator for injecting gas or air into the inflatable air bag in accordance with an air bag expansion triggering signal from the ECU to expand the air bag.

FIG. 10 illustrates a schematic view of the constitution of the conventional air bag apparatus. As shown in FIG. 10, if a shock is applied to a car body by a collision with another vehicle or an object while the vehicle is moving along a road, the vehicle's collision is monitored by a collision sensor 10 mounted to the forefront of the vehicle. Collision sensor 10 generates a collision sensing signal and supplies it to an ECU 20 when the shock against the car body exceeds a preset shock value required for inflating an air bag 40. ECU 20 determines whether or not the collision sensing signal is received from collision sensor 10 to provide an air bag expansion triggering signal to an inflator 30. Once the air bag expansion triggering signal is provided, inflator 30 injects an inert gas such as nitrogen $N_2$ or argon Ar, or air into inflatable air bag 40 to instantaneously inflate air bag 40. Consequently, the passenger in the vehicle can be protected from colliding with a structural part of the vehicle by the inflated air bag 40.

In the conventional air bag apparatus operated as above, various types of inflators for deploying the inflatable air bag are well known in the art.

Inflators are classified into a compressed gas filing-type inflator, a pyrotechnic inflator and a hybrid inflator.

The compressed gas filing-type inflator injects a quantity of stored compressed gas into the air bag to instantaneously inflate the air bag when a shock having a shock value above a predetermined threshold shock value is applied to a car body by a collision with another vehicle or an object. However, the compressed gas filing-type inflator includes a compressed gas storage vessel that is both heavy in weight and large in volume. Accordingly, it is difficult to install the compressed gas filing-type inflator. In addition, the temperature in the compressed gas storage vessel is decreased the instant that the compressed gas is released from the compressed gas storage vessel. Therefore, the air bag is inflated relatively slowly.

The pyrotechnic inflator instantaneously injects a high temperature and high pressure inflation gas produced by an explosive combustion of a pyrotechnic material and a gas generating material which is an ignitable material included in the inflator into a folded air bag having a volume of about 60 to 120 L to inflate the air bag when a shock having a shock value above a predetermined threshold shock value is applied to a car body by a collision with another vehicle or an object. Therefore, in the pyrotechnic inflator described above, large quantities of pyrotechnic material and gas generating material are required for perfect expansion of the air bag. Moreover, at the moment when the air bag expands, a driver or a passenger who makes contact with the air bag might get burnt by the high temperature and high pressure inflation gas and might suffer a secondary shock from making contact with the high pressure air bag. In addition, after expansion the air bag, the decreased pressure of the inflation gas causes the inflation force of the air bag to decrease.

The hybrid inflator was developed by synthesizing the compressed gas filing-type inflator and the pyrotechnic inflator. That is, the hybrid inflator takes advantage of the advantages of the compressed gas filing-type inflator and the pyrotechnic inflator, and removes the disadvantages of them. The hybrid inflator includes a pyrotechnic material, a gas generating material and a quantity of compressed gas stored therein. The hybrid inflator instantaneously injects a high temperature and high pressure inflation gas produced by the explosive combustion of the pyrotechnic material, the gas generating material, and the compressed gas into the folded air bag to inflate the air bag.

U.S. Pat. No. 5,273,312 issued to Terrance J. Coultas on Dec. 28, 1993 discloses a hybrid inflator as described above. The Terrance J. Coultas' hybrid inflator includes an actuator assembly capable of igniting an ignitable material such as a body of pyrotechnic material. The actuator assembly includes an another ignitable material such as a pyrotechnic charge which is ignited by an electric current supplied from ECU.

FIGS. 7 to 9 illustrate the Terrance J. Coultas' hybrid inflator 30 as described above. Inflator 30 includes a cylindrical container 50, a cylindrical diffuser 60 and a manifold assembly 70.

Container 50 defines a first cylindrical chamber 52 which is filled with a compressed gas. The gas is introduced into first cylindrical chamber 52 through a gas flow passage formed in an end cap 54. Container 50 includes a cylindrical one-piece steel wall 56. Steel wall 56 defines first cylindrical chamber 52. In addition, steel wall 56 has first circular openings 58 for releasing the gas and combustion products from inflator 30 into air bag 40.

Diffuser 60 is mounted on an outside of container 50. Diffuser 60 includes a cylindrical diffuser tube 62. Diffuser tube 62 has an annular lip 64 extending radially inwardly at an one end of diffuser tube 62. Lip 64 tightly engages an outer side of steel wall 56. An end cap 66 is welded to the other end of diffuser tube 62. End cap 66 is connected to an outer end of manifold assembly 70. A mounting stud 68 is installed at the middle portion of diffuser tube 62. Mounting stud 68 connects inflator 30 to a car body.

Manifold assembly 70 extends through steel wall 56 of container 50 at the end of container 50 opposite end cap 54. A portion of manifold assembly 70 is positioned within container 50 and supports an ignitable pyrotechnic material 72. Ignitable pyrotechnic material 72 includes a booster charge 74 and a body of pyrotechnic material 76. The other portion of manifold assembly 70 supports an actuator assembly 80 of container 50. A burst disk 82 is positioned between actuator assembly 80 and booster charge 74.

FIG. 8 illustrates manifold assembly 70 in detail. Manifold assembly 70 includes a cylindrical metal manifold plug 78 disposed to the outside of container 50. Manifold plug 78 has a cylindrical interior cavity 90. A second circular opening 94 is formed at a cylindrical side wall 92 of manifold plug 78.

A third circular opening 96 is formed in container 50 at an one end of manifold plug 78. Burst disk 96 is positioned across third circular opening 96. Burst disk 82 has a dome shaped central portion 84 and a flat annular rim portion 86. Rim portion 86 is secured to manifold plug 78. Burst disk 82 blocks the flow of gas from first cylindrical chamber 52 through third circular opening 96 into manifold plug 78 until burst disk 82 is ruptured by actuator assembly 80.

An outer end of manifold plug 78 is closed by a circular end wall 100. Actuator assembly 80 is mounted on end wall 100. End wall 100 supports actuator assembly 80. Manifold assembly 70 includes a hollow metal holder 102. Metal holder 102 is coaxial with manifold plug 78 and is disposed in container 50.

A fourth circular opening 106 is formed in a side wall 104 of metal holder 102. The fourth circular opening 106 allows for fluid communication of first cylindrical chamber 52 with third circular opening 96.

Referring to FIG. 7 again, booster charge 74 is disposed in a second cylindrical chamber 108 formed in an end of metal holder 102. Before operation of actuator assembly 80, second cylindrical chamber 108 is fluid-communicated with a third cylindrical chamber 112 via a fifth circular opening 110.

A cylindrical metal housing 120 encloses pyrotechnic material 76. The end of metal housing 120 opposite manifold assembly 70 is closed except for a circular orifice 122. An inside of metal housing 120 is fluid-communicated with first cylindrical chamber 52 of container 50 by orifice 122. The gas stored in first cylindrical chamber 52 can flow into a housing chamber 124 around pyrotechnic material 76 through orifice 122. A baffle plate 126, a circular screen 128 and a flat circular orifice plate 130 are disposed between orifice 122 and pyrotechnic material 76. Orifice plate 130 has an orifice (not shown) extending through it.

During burning pyrotechnic material 76, a flow of the combustion products from pyrotechnic material 76 impinges against baffle plate 126. Baffle plate 126 provides a tortuous path for combustion products in metal housing 120. Therefore, some particles generated from pyrotechnic material 76 may be trapped in metal housing 120. Thereafter, the particles of combustion products pass through baffle plate 126 and flow through screen 128, orifice plate 130 and orifice 122 into first cylindrical chamber 52. In addition, during the burning pyrotechnic material 76, a flame is conducted through orifice plate 130 and orifice 122 into first cylindrical chamber 52.

During the initial burning of pyrotechnic material 76, a relatively small opening (not shown) in orifice plate 130 restricts the flow of combustion products from housing chamber 124. As a result, the pressure and the temperature in housing chamber 124 increase in such a manner as to promote the burning of pyrotechnic material 76.

Referring to FIG. 8 again, actuator assembly 80 operates to rupture burst disk 82 and to ignite booster charge 74. Actuator assembly 80 includes a cylindrical housing 140. In housing 140, a piston 142 and a pyrotechnic charge 144 are disposed in a coaxial relationship. Housing 140 includes a cylindrical outer housing member 146, a cylindrical casing 148 and a cylindrical inner housing member 150. Outer housing member 146 is secured to end wall 100 of manifold plug 78, and is disposed in a coaxial relationship with burst disk 82, booster charge 74 and pyrotechnic material 76. Casing 148 is disposed within outer housing member 146, and extends around inner housing member 150. Casing 148 electrically insulates inner housing member 150 from outer housing member 146.

Inner housing member 150 forms a fourth cylindrical chamber 154 in which piston 142 and pyrotechnic charge 144 are disposed. Inner housing member 150 has an annular end flange 156. Flange 156 defines a fifth circular opening 158 of fourth cylindrical chamber 154. Piston 142 is formed from a single piece of metal and has a cylindrical head end 162. A smaller-diameter cylindrical piston rod 164 extends axially away from head end 162. A cylindrical piston passage 166 is coaxial with and extends through head end 162 and piston rod 164. Piston rod 164 has a pointed tip at its outer end 174.

A cylindrical end cap 172 encloses outer end 174 of piston rod 164 and inner housing member 150. End cap 172 consists of polypropylene and is inserted over inner housing member 150 and outer end 174 of piston rod 164. End cap 172 is bonded between casing 148 and inner housing member 150. End cap 172 blocks piston passage 166 to prevent contaminants from entering piston passage 166. Also, end cap 172 electrically insulates the outer end of inner housing member 150 from piston rod 164. An annular O-shaped ring 178 is disposed on head end 162 of piston 142.

Pyrotechnic charge 144 is disposed in a head end 180 of fourth cylindrical chamber 154. A squib 182 is located adjacent pyrotechnic charge 144. Two electrically conductive pins 184 and 186 are connected with squib 182. Electrically conductive pins 184 and 186 extend through casing 148, and through an opening formed in the end of outer housing member 146 adjacent end wall 100. Electrically conductive pins 184 and 186 provide a path for supplying an electrical current to actuate squib 182.

Hereinbelow, the operation of conventional hybrid inflator 30 described above will be described.

If a shock having a shock value above a predetermined threshold shock value is applied to a car body by a collision with another vehicle or an object while the vehicle is moving along a road, the vehicle's collision is monitored by collision sensor 10. Then, collision sensor 10 generates a collision sensing signal and supplies it to ECU 20. Thereafter, ECU 20 supplies an electrical current to electrically conductive pins 184 and 186 of actuator assembly 80 of inflator 30. The electrical current transmitted to electrically conductive pins 184 and 186 causes squib 182 to ignite pyrotechnic charge 144. The high density of the combustion products generated by burning the pyrotechnic charge push against head end 162 of piston 142. Thereby, piston 142 within fourth cylindrical chamber 154 moves from a retracted position shown in FIG. 7 to an extended position shown in FIG. 9.

As piston 142 moves, end cap 172 is ruptured by outer end 174 of piston 142. At this time, hot combustion products are conducted through piston passage 166 to destroy the remaining portion of end cap 172 blocking piston passage 166.

Meanwhile, as piston 142 moves, piston rod 164 passes through fourth circular opening 158. Outer end 174 of piston rod 164 strikes against the center of burst disk 82 and ruptures burst disk 82. As a result, fluid pressure in container 50 deforms burst disk 82 axially outwardly. Thereby, a seventh circular opening 98 (not shown) is formed, and the compressed gas escapes from first cylindrical chamber 52.

The compressed gas in first cylindrical chamber 52 flows from first cylindrical chamber 52 through fourth circular opening 106 into a chamber in metal holder 102. The gas which has passed through seventh circular opening 98 flows around rod end 174 of piston 142, and flows into internal cavity 90 of manifold plug 78. From internal cavity 90, the gas flows through second circular opening 94 into diffuser chamber 84. From diffuser chamber 84, the gas flows through first circular opening 58 into air bag 40.

After rupturing burst disk 82, piston 142 continues to move axially under the influence of combustion products resulting from the burning of pyrotechnic charge 144 to its extended position. Outer end 174 of piston rod 164 moves into fifth circular opening 110 of metal holder 102. Hot combustion products resulting from the burning of pyrotechnic charge 144 are conducted through piston passage 166 into fifth circular opening 110 of metal holder 102. Hot combustion products flow through fifth circular opening 110 of metal holder 102, and strike against the end portion of pyrotechnic charge 74. As a result, pyrotechnic charge 74 is ignited. Booster charge 74 burns at a relatively high temperature to conduct heat and flame toward pyrotechnic material 76. The heat and flame from burning booster charge 74 are effective in igniting pyrotechnic material 76.

As pyrotechnic material 76 begins to burn, hot combustion products and flame flow through baffle plate 126, screen 128, orifice plate 130 and housing orifice 122 into first cylindrical chamber 52. During the burning of pyrotechnic material 76, the temperature in chamber 124 reaches approximately 2,000° C. This relatively high temperature is more than sufficient to enable the hot combustion products and flame to melt orifice plate 130 and increase the diameter of the orifice in orifice plate 130 to the same size as the diameter of housing orifice 122. The hot combustion products and flame heat the compressed gas in first cylindrical chamber 52. Also, a gas generated by burning pyrotechnic material 76 supplements the compressed gas in first cylindrical chamber 52. As the compressed gas in first cylindrical chamber 52 is heated, fluid pressure in first cylindrical chamber 52 increases. As a result, the flow rate of the gas flowing through manifold assembly 70 to diffuser 60, and then into air bag 40, increases.

With Terrance J. Coultas' hybrid inflator as described above, the mechanism for producing the inflation gas and for supplying the inflation gas together with the quantity of stored compressed gas into the folded air bag is complicated. In addition, Terrance J. Coultas' hybrid inflator employs a complicated means for producing the inflation gas and for injecting the inflation gas together with the compressed gas in the compressed gas storage vessel into the air bag. Therefore, Terrance J. Coultas' hybrid inflator has the disadvantages in that the manufacturing process thereof is complicated and the manufacturing cost thereof is high.

SUMMARY OF THE INVENTION

The present invention is contrived to solve the foregoing problems. It is an object of the present invention to provide a hybrid air bag system including an improved hybrid inflator which has a simple internal structure and can be manufactured at a low cost.

In order to achieve the above object, the present invention provides a hybrid air bag system for a motor vehicle, the hybrid air bag system comprising:

a first container defining a first internal cavity, the first container having a cover which is ruptured at a collision of the motor vehicle and a bottom plate, in which the bottom plate is positioned at the lower inner portion of the cover and is engaged with the cover;

an inflatable air bag for being unfolded by introduction of a compressed gas and combustion products therein, the inflatable air bag being folded in the first internal cavity, having free ends which are secured between the cover and the bottom plate, and defining a second internal cavity between the bottom plate and the inflatable air bag; and a hybrid inflator for generating the combustion products and for inflating the inflatable air bag when a collision sensing signal is generated at the collision of the motor vehicle, the hybrid inflator being mounted on the bottom plate in the second internal cavity and including a second container, the second container having a first steel wall integrally formed to define a first chamber which is filled with the compressed gas and is then sealed.

The cover includes an internal score line being easily ruptured by the inflatable air bag at the collision of the motor vehicle and second flanges extending downward from a periphery of the cover.

The bottom plate has a planar main body, L-shaped sleeves extending downward from the center of the main body in order to receive the hybrid inflator, first flanges extending downward from both side portions of the main body so that the first flanges correspond with the second flanges, and a plurality of mounting studs for connecting the hybrid air bag system to a structural part of the motor vehicle.

The first flanges and the second flanges have rivet holes which are formed through the first flanges and the second flanges respectively and are engaged together with the free ends extending downward between the first flanges and the second flanges by the rivets which go through the rivet holes. The free ends of the air bag extend downward and are retained by retainer frames.

The hybrid inflator comprises:

a first cylindrical housing defining a third internal cavity and having a second steel wall, in which the second steel wall is welded and engaged to the first steel wall, has a plurality of first circular openings being formed adjacent to a combining position of the first steel wall and the second steel wall, and has a first annular rim extending radially inwardly in order to form a second circular opening at an one end of the first cylindrical housing;

a burst disk being positioned across the second circular opening and being secured on the first annular rim at a first weld so that a seal is formed at the first weld;

a second cylindrical housing being positioned within the first cylindrical housing, being welded and engaged to the inner surface of the first cylindrical housing at a second weld so that a seal is formed at the second weld, and including a second annular rim which extend radially inwardly to form a fourth circular opening at an one end of the second cylindrical housing, a third container having a pyrotechnic heater therein, a third chamber having a booster charge and a gas generating material therein, and a plurality of gas flow passages being formed between the third container and the third chamber; and a third cylindrical housing defining a fourth chamber and having a third annular rim which extend radially inwardly to form a fifth circular opening at an one end of the third cylindrical housing, and which is mounted on the second cylindrical housing at a fifth weld so that a seal is formed at the fifth weld, in which the fourth chamber includes an operation pin for releasing the compressed gas and the combustion products, and includes a plate spring for elastically supporting the operation pin in the fourth chamber.

The hybrid inflator further comprises a ceramic filter disposed across the first circular opening and a metal filter disposed across the fourth circular opening.

In addition, the hybrid inflator further comprises a second combustible thin film vessel enclosing the booster charge and the gas generating material in the third chamber, and a second thin metal diaphragm disposed in the second thin film vessel in order to isolate the booster charge from the gas generating material. Preferably, the second thin film vessel is made of aluminum or steel.

In addition, the hybrid inflator further comprises an auxiliary disk disposed across the fifth circular opening.

The burst disk has a dome shaped central portion which is ruptured by the operation pin and a flat annular rim portion which is secured to the first annular rim.

The pyrotechnic heater includes an inner end extending radially inwardly to form a third circular opening, an outer end integrally formed with the inner end, a second chamber including a pyrotechnic charge therein, a squib for igniting the pyrotechnic charge, and an adapter for securing the squib.

The pyrotechnic heater further includes a metal plug and a first thin metal film disposed across said third circular opening respectively. The metal plug is fitted into the inner end, and the first metal thin film is secured on the inner end at a fourth weld so that a seal is formed at the fourth weld.

The pyrotechnic heater further includes a first combustible thin film vessel enclosing the pyrotechnic charge in the second chamber. The first thin film vessel is made of aluminum or steel.

The outer end is welded and engaged to the L-shaped sleeve at a third weld so that a seal is formed at the third weld. The squib has an electric current from an outside current supply source. The adapter has a first O-shaped sealing ring for sealing the adapter.

The operation pin has a sharp tip, a through hole formed through the center of the operation pin, a lower end surface, and a second O-shaped sealing ring, and wherein the operation pin moves upwardly by the pressure of the combustion products and ruptures the auxiliary disk and the disk in sequence when the combustion products are generated by burning the pyrotechnic charge, the booster charge, and the gas generating material.

The plate spring includes a dome shaped central portion which has a plurality of gas flow holes and a flat annular rim portion which is secured to the second annular rim.

The compressed gas is a gas selected from the group consisting of an inert gas, an inflammable fuel gas and an oxidizer gas. The inert gas is a gas selected from the group consisting of nitrogen $N_2$, argon Ar, and a mixture of nitrogen $N_2$ and argon Ar.

The gas flow passages allow fluid communication of the second chamber with the third chamber.

As described above, instead of an operation means, the hybrid air bag system according to the present invention is provided with an operation pin having a simple structure for opening the flow passages running to the air bag. Thereby, the total internal structure of hybrid inflator is simplified. In addition, the manufacturing cost of the hybrid air bag system is reduced.

BRIEF DESCRIPTION OF THE DRAWINGS

The above objects and other advantages of the present invention will become more apparent by describing in detail preferred embodiments thereof with reference to the attached drawings, in which.

DESCRIPTION OF THE PREFERRED EMBODIMENT

Hereinbelow, one embodiment of the present invention will be described in detail with reference to the accompanying drawings.

Figure 1:
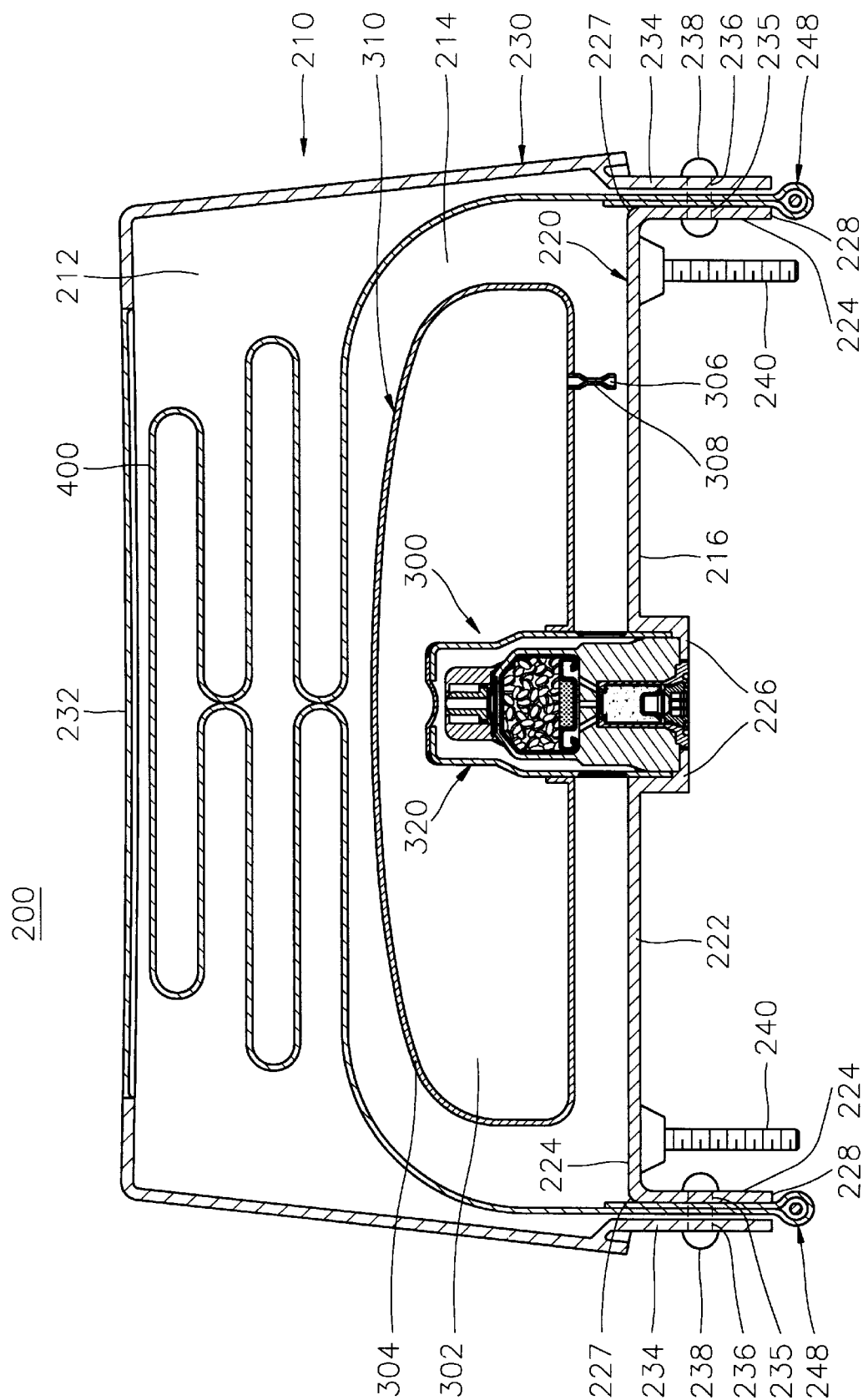
FIG. 1 is a sectional view for showing a hybrid air bag system according to the preferred embodiment of the present invention.

FIG. 1 is a view for showing a hybrid air bag system 200 according to the preferred embodiment of the present invention. Hybrid air bag system 200 includes a first container 210, a folded air bag 400 arranged in first container 210, and a cylindrical inflator 300 fixed to first container 210.

First container 210 is assembled outside an automotive vehicle and then is located in vehicles as whole unit. First container 210 has a subassembly which is separate from the inflator 300 and which can be conveyed and stored separately. First container 210 is combined with inflator 300 at the final assembly stage of air bag system 200. First container 210 has a bottom plate 220 and a cover 230 which is fixed to bottom plate 220. First container 210 restricts a first internal cavity 212 where folded air bag 400 is located.

Bottom plate 220 is engaged with cover 230 at a lower inside of cover 230. Bottom plate 220 has a planar main body 222 and a series of first flanges 224 extending from main body 222. In case that bottom plate 220 is integrated within first container 210, the lower outer surface of main body 224 forms an outside wall 216 of first container 210. L-shaped sleeves 226 are formed at the middle portion of main body 222. L-shaped sleeves 226 extend downward from main body 222 in order to receive inflator 300.

First flanges 224 are integrally formed with main body 222, and are downward prolonged from perimeters of main body 222 in the vertical direction. First flanges 228 located on the perimeter of main body 222 are suitable for fixing the cover 230 on bottom plate 220. Also, first flanges 228 form a structure that maintains a state where air bag 400 is fixed to bottom plate 220 when air bag 400 expands. To prevent the formation of a sharp corner which bursts the fabric of the air bag, connection portions 227 between planar main body 222 and first flanges 224, and end portions 228 of first flanges 224 are curve-shaped.

A plurality of mounting studs 220 are installed to bottom plate 220. Studs 220 are used to connect air bag system 200 to a structural part of a motor vehicle. Studs 220 are integrally connected with main body 222, and then are prolonged outwardly from main body 222.

Cover 230 comprises a hardened flexible plastic material such as ployethlene, a material which is usually used for making the dashboard of a vehicle. An internal score line 232 having a predetermined shape is formed inside cover 230. Internal score line 232 is formed at predetermined positions on cover 230 so that cover 230 ruptures when air bag 400 expands.

Cover 230 is a member having a cup shape. Cover 230 has second flanges 234. Second flanges 224 are downward prolonged from perimeters of cover 230 in the vertical direction. Second flanges 234 are integrally formed with the boundary of cover 230. Second flanges 234 has such a size that second flanges 234 can be accurately fixed from the outside perimeter of bottom plate 220 to around first flanges 224. Rivet holes 235 and 236 are respectively formed at first flanges 224 on bottom plate 220 and at second flanges 234 on cover 230. Rivet holes 235 and 236 are arranged to fix cover 230 on bottom plate 220 so that either rivets 238 or same other fixing element may pass through them.

Generally, air bag 400 is a continuous fabric and consists of a tough and durable fabric such as nylon. Air bag 400 is arranged between cover 230 and bottom plate 220. That is, air bag 400 is arranged in a furrow-shaped folded state so that there is a second internal cavity 214 between air bag 400 and bottom plate 220 in first internal cavity 212.

Free ends of air bag 400 extend downward and are disposed within first flanges 224 and second flanges 234. The free ends of air bag 400 are fixed between first flanges 224 and second flanges 234 by rivets 238 passing through rivet holes 235 and 236. Thereafter, the free ends of air bag 400 are retained in a retainer frame 248 located outside first container 210. Therefore, air bag 400 is fixed in a first container 200, such as a cover 230 which is fixed to bottom plate 220.

After first container 210 is assembled, inflator 300 for inflating air bag 400 is attached to first container 210. That is, inflator 300 is attached to an assembled first container 210, thereby completing air bag system 200. Inflator 300 is positioned between L-shaped sleeves 226 formed in the middle portion of bottom plate 220, and is positioned within second internal cavity 214 defined by air bag 400.

In second internal cavity 214, inflator 300 includes second container 310. Second container has a cylindrical shape extending horizontally, so the total height of air bag system 200 is reduced. Second container 310 includes a first one-piece steel wall 304. Free ends of steel wall 304 are welded and engaged to first cylindrical housing 320 of inflator 300.

First steel wall 304 defines a first chamber 302 which contains a quantity of stored compressed gas stored therein. First chamber 302 contains a mixture of gases including an inert gas, a flammable fuel gas, and an oxidizer gas. Preferably, the inert gas is nitrogen ($N_2$), argon (Ar), or a mixture of nitrogen and argon. Second container 310 has a filling tube 306 for filing the compressed gas into first chamber 302. Filling tube 306 is installed so that it runs through second container 310. Filling tube 306 has a pinch 308. After first chamber 302 is filled with the compressed gas, pinch 308 is welded in order to close filling tube 306.

Figure 2:
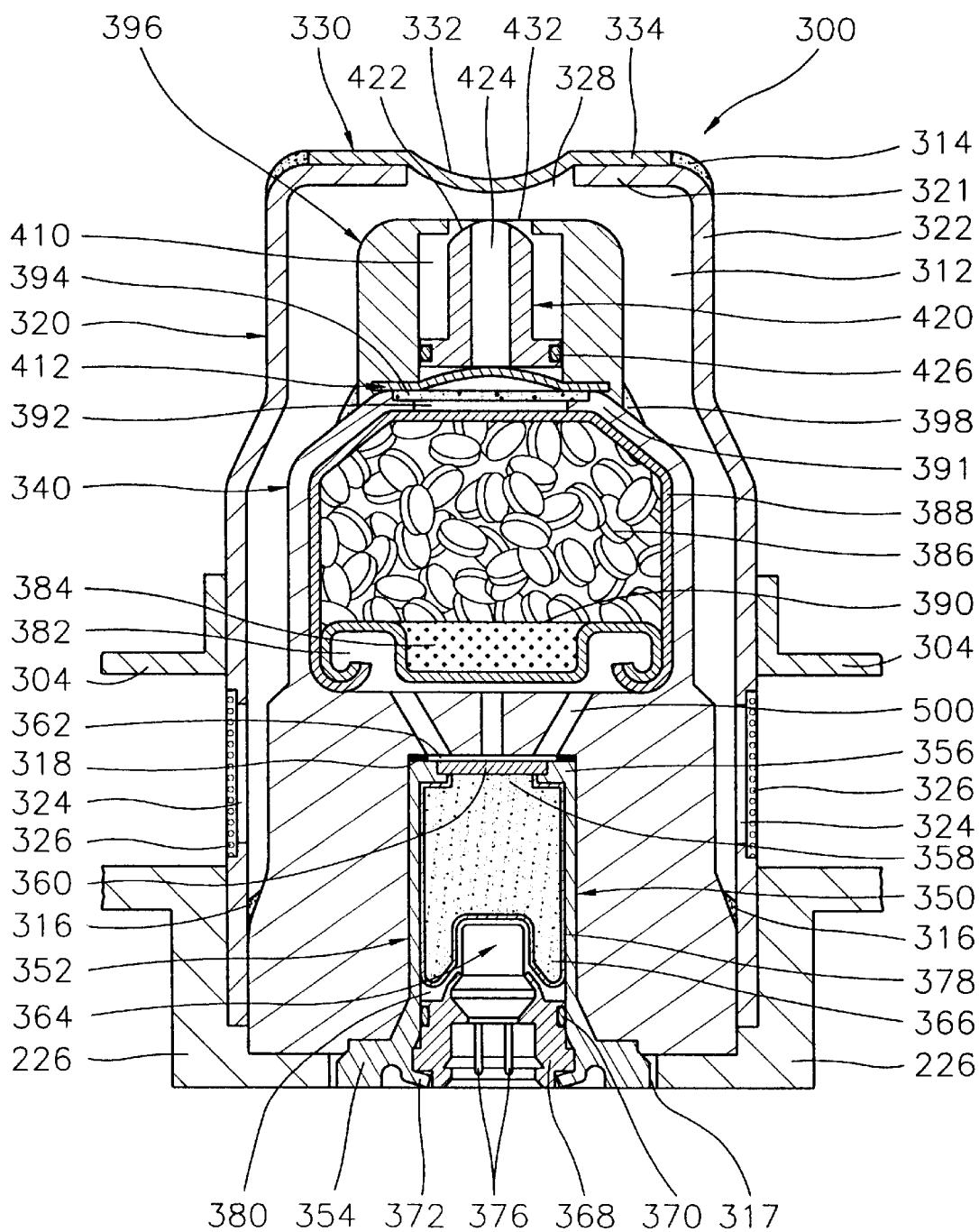
FIG. 2 is an enlarged sectional view for showing a hybrid inflator of the hybrid air bag system as shown in FIG. 1.
Figure 3:
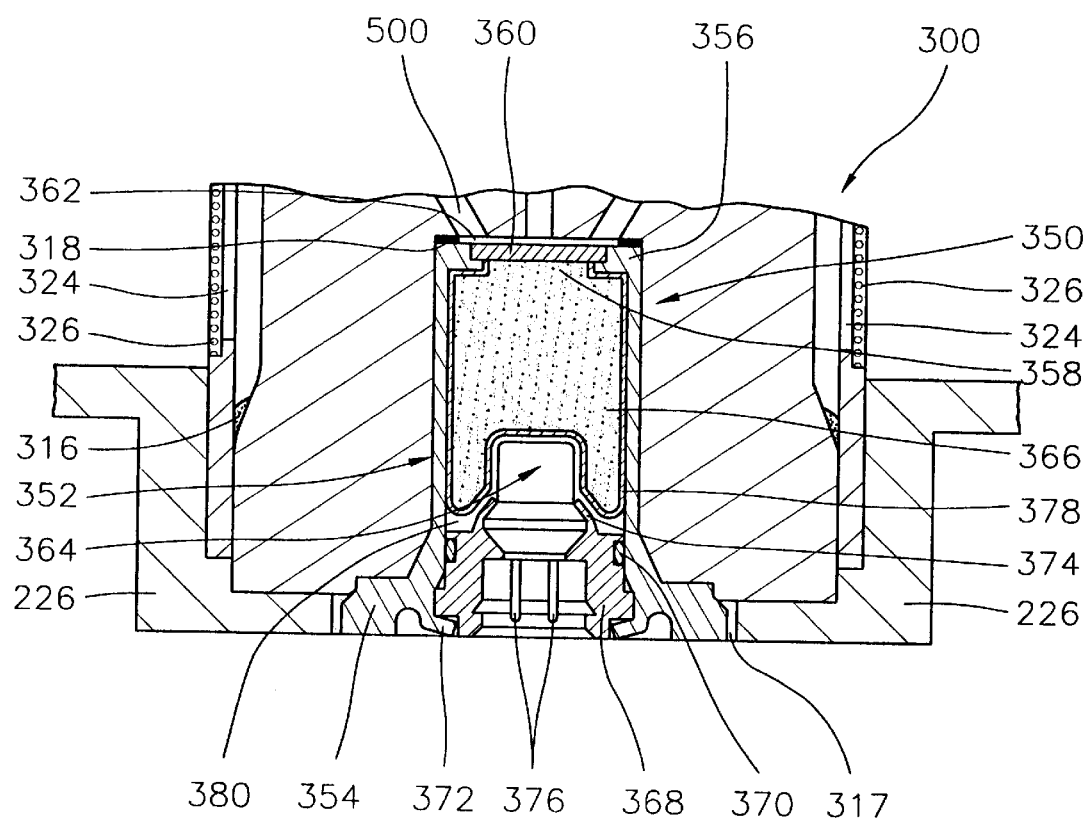
FIG. 3 is an enlarged sectional view for showing a pyrotechnic heater of the hybrid inflator as shown in FIG. 2.
Figure 4:
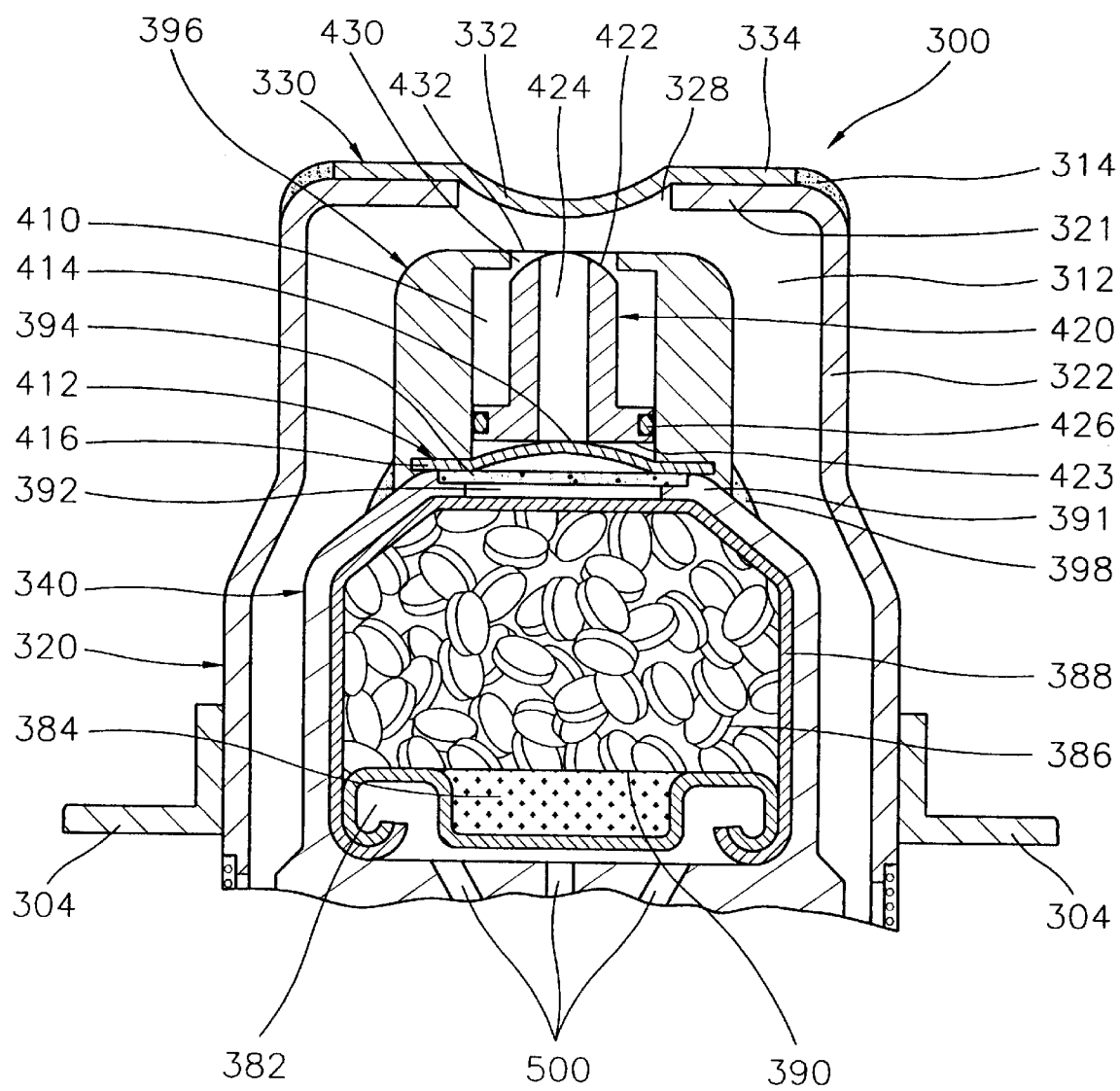
FIG. 4 is an enlarged sectional view of a portion of the hybrid inflator as shown in FIG. 3 except for the pyrotechnic heater.

FIGS. 2 to 4 illustrate in detail hybrid inflator 300 according to the present invention in detail.

First, referring to FIG. 2, inflator 300 includes a first cylindrical container 320. First cylindrical housing 320 defines a third internal cavity 312. First cylindrical housing 320 includes a second one-piece steel wall 322. Second steel wall 322 defines third internal cavity 312. First steel wall 304 forming second container 310 is welded and engaged to an outer surface of second steel wall 322 so that a seal is created between first steel wall 304 and second steel wall 322.

A plurality of first circular openings 324 are formed in second steel wall 322. First circular openings 324 are formed through second steel wall 322 at a position underneath the combining position of first steel wall 304 and second steel wall 322. First circular openings 324 allow for fluid communication of third internal cavity 312 with second internal cavity 214. A ceramic filter 326 is disposed at first circular openings 324. Ceramic filter 326 is disposed across first circular openings 324.

First cylindrical housing 320 has a first annular rim 321 extending radially inwardly. First annular rim 321 forms second circular opening 328. Second circular opening 328 is closed by a rupturable disk 330. Disk 330 extends across second circular opening 328, and is secured to first annular rim 321 by a first weld 314. Disk 330 has a dome shaped central portion 332 and an annular rim portion 334.

A second cylindrical housing 340 is positioned within first cylindrical housing 320. Second cylindrical housing 340 is welded and engaged to a lower inner surface of first cylindrical housing 320 by a second weld 316 so that a seal is created between second cylindrical housing 340 and first cylindrical housing 320. A pyrotechnic heater 350 is positioned in a lower inner portion of second cylindrical housing 340.

FIG. 3 illustrates an internal structure of pyrotechnic heater 350. Pyrotechnic heater 350 includes a third cylindrical container 352. Third container 352 has an enlarged outer end 354. Outer end 354 connects with L-shaped sleeves 226 of bottom plate 224. Outer end 354 and L-shaped sleeves 226 are connected to form a seal by a third weld 317. Third container 352 has an inner end 356 integrally formed with outer end 354. At inner end 356, a third circular opening 358 is provided. Third circular opening 358 is covered by a metal plug 360 and a first thin metal diaphragm 362. First thin metal diaphragm 362 and inner end 356 are connected to form a seal by a fourth weld 318 at the periphery of first thin film diaphragm 362. Metal plug 360 provides a back-up support for first thin metal diaphragm 362 over the entire area thereof. Therefore, first thin metal diaphragm 362 can withstand the high pressure gas stored in second chamber 380.

A squib 364 and a pyrotechnic charge 366 are contained within third container 352. Squib 364 is retained within third container 352 by a hollow cylindrical mounting adapter 368. Mounting adapter 368 is sealed by O-shaped sealing ring 370 installed at the outer periphery of mounting adapter 368. A first circumferential crimp 372 formed in outer end 354 securely retains mounting adapter 368 in third container 352.

Squib 364 is located adjacent to pyrotechnic charge 366. Squib 364 is retained within third container 352 by a second crimp 374 integrally formed with and extending from mounting adapter 368 and then extending. Two electrically conductive pins 376 are connected with squib 364. Electrically conductive pins 376 are electric input terminals. Electrically conductive pins 376 extend outward from the lower portion of third container 352, and are connected with a current supply source (not shown). Electrically conductive pins 376 provide a path for an electrical current to squib 364.

Pyrotechnic charge 366 is contained within a first thin film diaphragm 378 made of aluminum or steel in second chamber 380. Although pyrotechnic charge 354 could have many different compositions, in one preferred embodiment of the present invention, pyrotechnic charge 354 comprises a granular mixture of Boron Potassium Nitrate ($BKNO_3$).

Referring to FIG. 2 again, a third chamber 382 is formed at the upper portion of second cylindrical housing 340. A plurality of gas flow passages 500 are formed between second chamber 380 and third chamber 382. Gas flow passages 500 allow for fluid communication of second chamber 380 with third chamber 382.

As shown in FIG. 4, a booster charge 384 of granular mixture, and a gas generating material 386 of a pellet-like construction or a disc-like construction are retained within third chamber 382. Booster charge 384 and gas generating material 386 are retained within a second thin film vessel 388 made of aluminum or steel in third chamber 382. Within second thin film vessel 388, booster charge 384 and gas generating material 386 are separated by a second thin film diaphragm 390 made of aluminum.

Second thin film vessel 388 is fitted with the inner wall of second cylindrical housing 340 to space out the bottom surface of third chamber 382. Second thin film vessel 388 makes thermally-efficient contact with the inner wall of second cylindrical housing 340.

Second cylindrical housing 340 defining third chamber 382 includes a second annular rim 391 radially inwardly extending from second cylindrical housing 340. Second annular rim 391 forms a fourth circular opening 392. A metal filter 394 is disposed at fourth circular opening 392. Metal filter 394 is disposed across fourth circular opening 392. Metal filter 394 removes impurities from combustion products which are generated from pyrotechnic charge 366 contained within first thin film vessel 378, booster charge 384, and gas generating material 386 contained within second thin film vessel 388.

A third cylindrical housing 396 is engaged with second cylindrical housing 340 so that a seal is formed at a position adjacent to second annular rim 391. Third cylindrical housing 396 is welded and engaged with second cylindrical housing 340 by a fifth weld 398 so that a seal is formed. Third cylindrical housing 396 defines a fourth chamber 410. A plate spring 412 is positioned in the lower portion of fourth chamber 410. Plate spring 412 elastically supports an operation pin 420. Operation pin 420 is slidable and vertically positioned within fourth chamber 410.

Figure 6A:
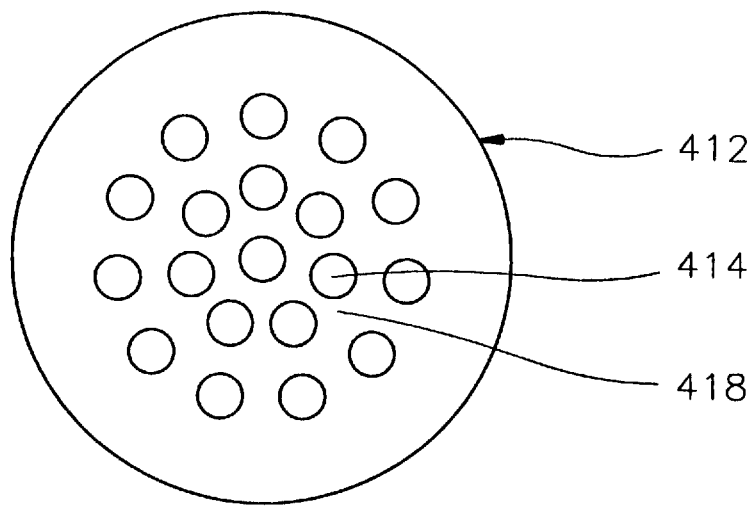
FIG. 6A is a plan view of a plate spring according to the present invention.

As shown in FIG. 6A, plate spring 412 has a dome shaped central portion 414 and a flat annular rim portion 416. In addition, plate spring 412 has a plurality of gas flow holes 418 allowing for gas flow. Plate spring 412 is secured to the outer surface of second annular rim 391 by welding rim portion 416 at the lower portion of fourth chamber 410.

Figure 6B:
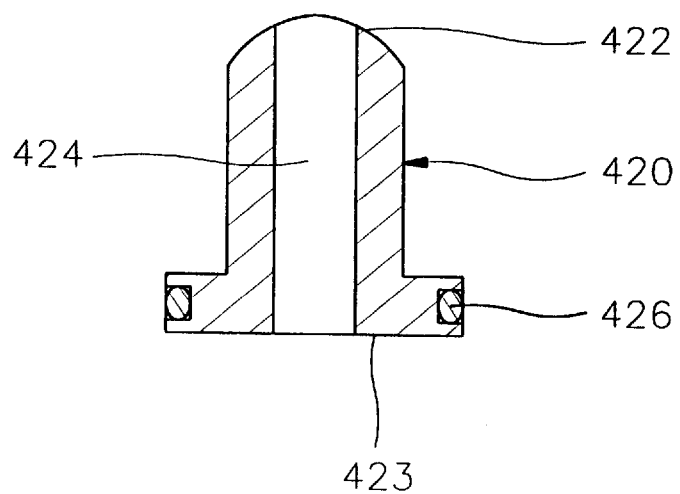
FIG. 6B is an enlarged longitudinal sectional view of the operation pin according to the present invention.
Figure 7:
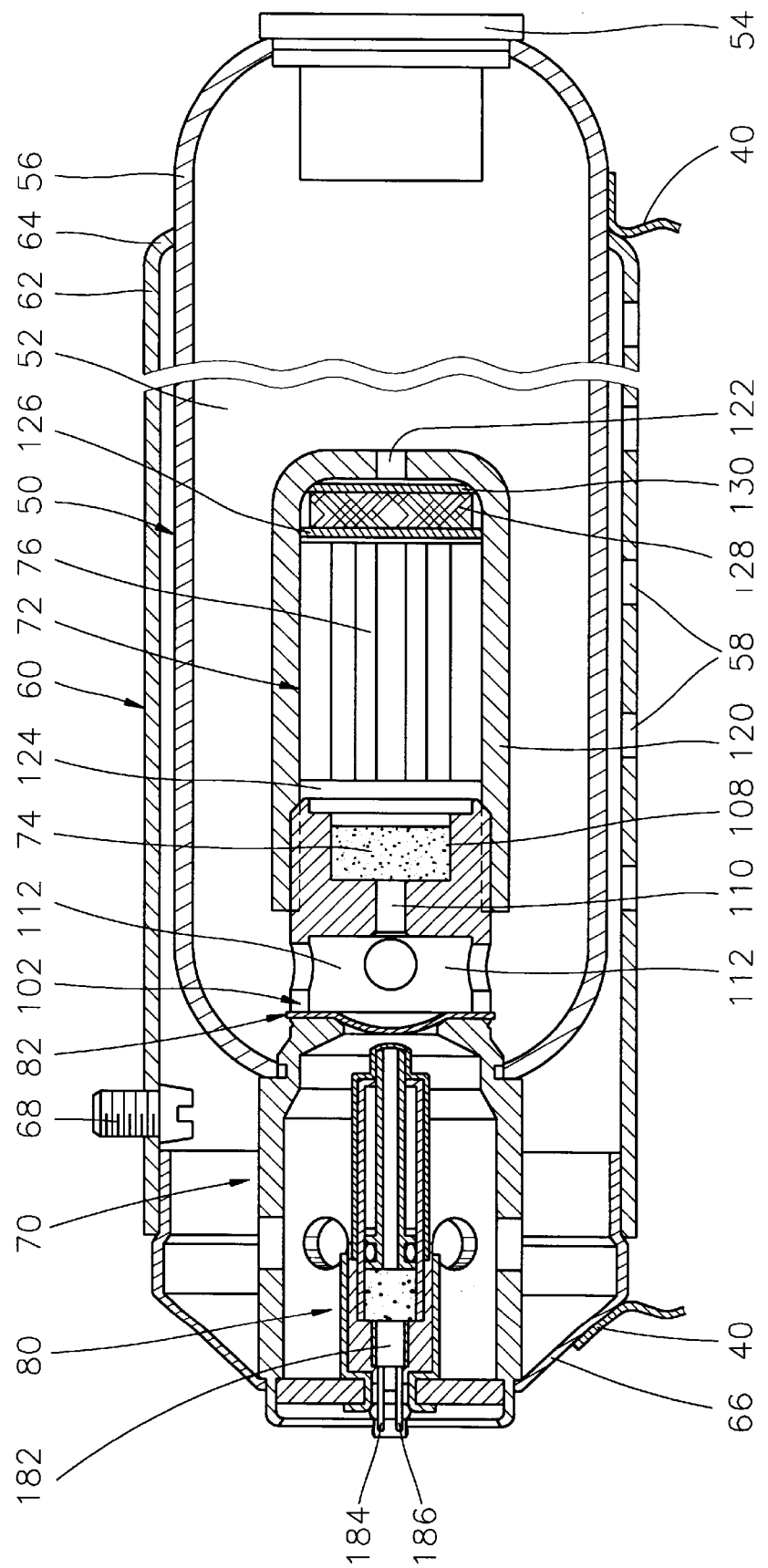
FIG. 7 is an sectional view of a hybrid inflator which is constructed in accordance with the prior art.
Figure 8:
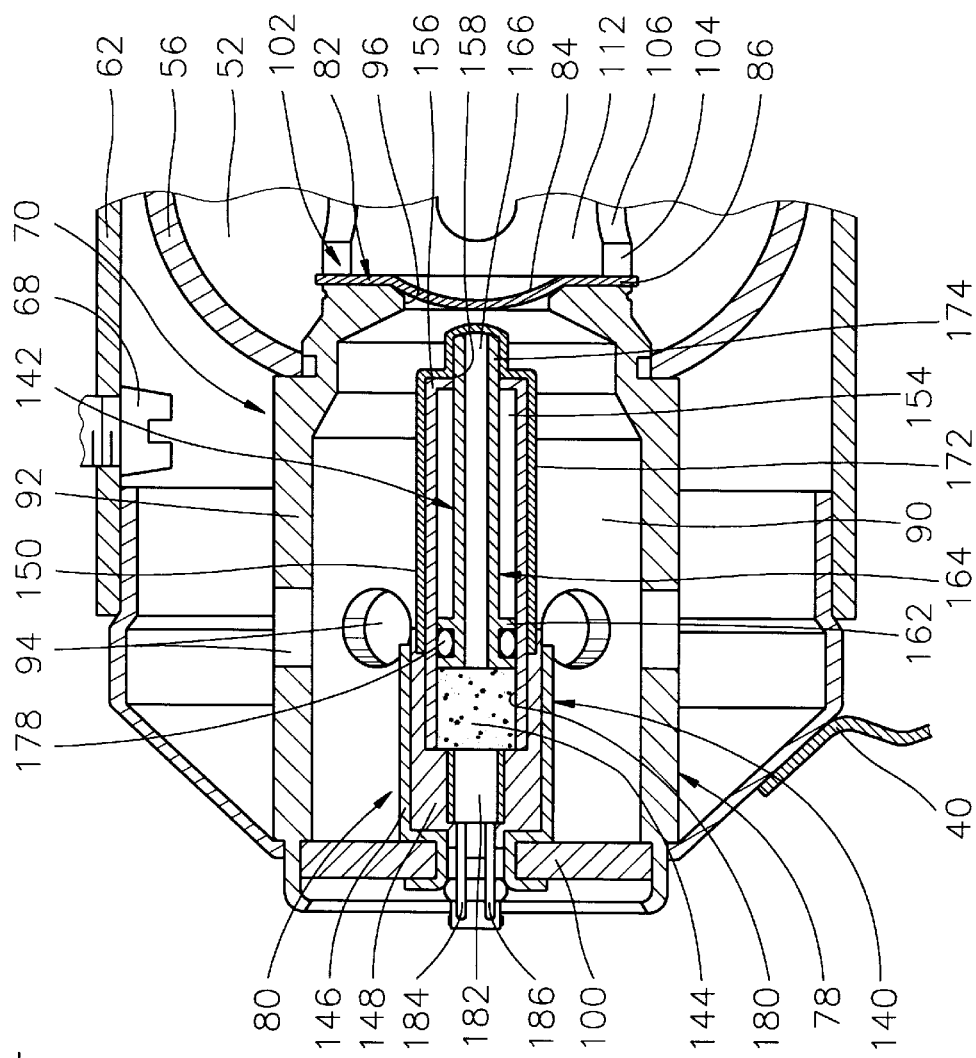
FIG. 8 is an enlarged fragmentary sectional view of a portion of the hybrid inflator as shown in FIG. 7.
Figure 9:
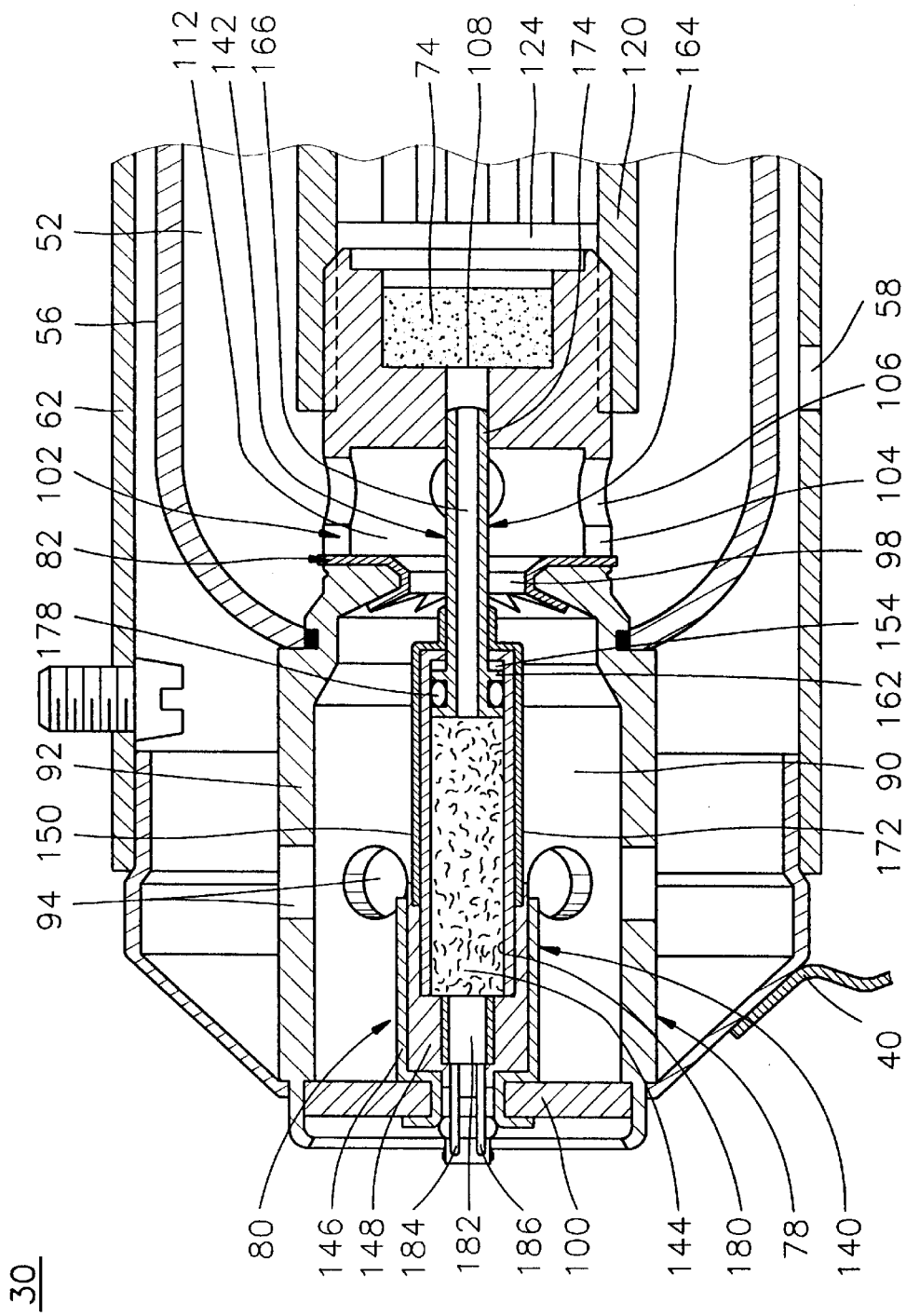
FIG. 9 is an enlarged fragmentary sectional view of a portion of the hybrid inflator as shown in FIG. 7.
Figure 10:
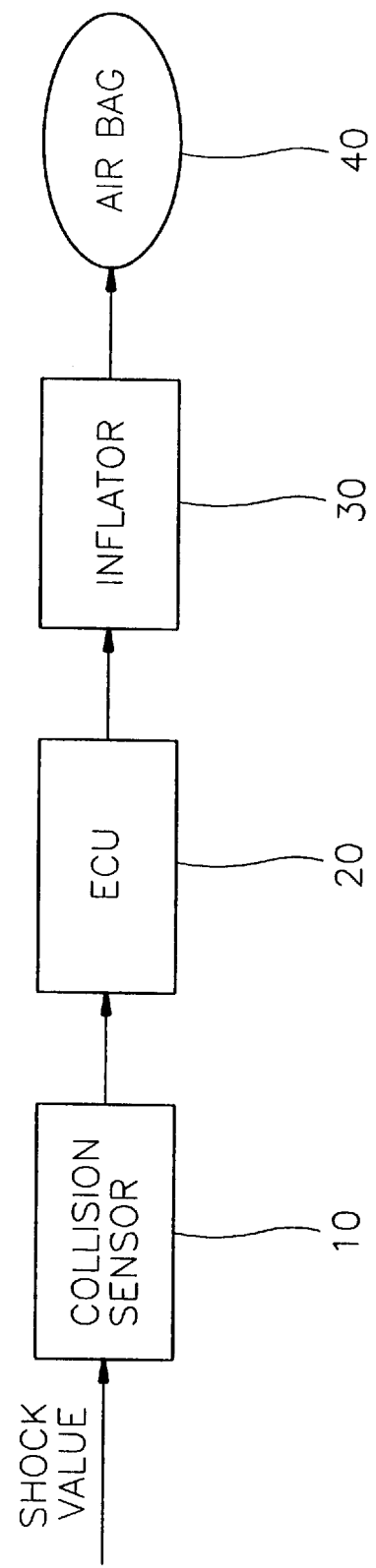
FIG. 10 is a block diagram schematically showing a construction of a conventional air bag system.

As shown in FIG. 6B, operation pin 420 has a sharp tip 422 for rupturing disk 330 and a flat lower end surface 423. A through hole 424 is formed in the middle portion of operation pin 420. Through hole 424 is a flow passage for the combustion products which are generated by burning pyrotechnic charge 366, booster charge 384 and gas generating material 386. A second O-shaped sealing ring 426 is installed at the lower periphery of operation pin 420.

Third cylindrical housing 396 has a third annular rim 428 extending radially inwardly. Third cylindrical housing 396 forms a fifth circular opening 430. An auxiliary disk 432 is disposed at fifth circular opening 430. Auxiliary disk 432 comprises a thin metal film, and is disposed across fifth circular opening 430. Auxiliary disk 432 seals fifth circular opening 430 until operation pin 420 is operated. Auxiliary disk 432 is ruptured by operation pin 420 when operation pin 420 is operated.

Hereinbelow, the operation of hybrid inflator 300 according to the preferred embodiment of the present invention described above will be described.

If a shock having a shock value above a predetermined threshold shock value is applied to a car body by a collision with another vehicle or an object while the vehicle is moving along a road, the vehicle's collision is monitored by a collision sensor (not shown). The collision sensor generates a collision sensing signal and supplies it to an ECU (not shown). Thereafter, the ECU supplies an electrical current to electrically conductive pin 376 of pyrotechnic heater 350 of inflator 300.

The electrical current transmitted to electrically conductive pin 376 causes squib 364 to ignite pyrotechnic charge 366 contained within first thin film vessel 378. Combustion products including a high temperature and high pressure inflation gas are generated by the burning of pyrotechnic charge 366. As combustion products having the high temperature and high pressure inflation gas are generated, metal plug 360, which closes third circular opening 358, is unseated from its initial position. Subsequently, first thin film diaphragm 362 supported by metal plug 360 is ruptured by the combustion products and combustion products are released through third circular opening 358 into a plurality of gas flow passages 500.

Combustion products flow through gas flow passages 500 into third chamber 382. Combustion products introduced into third chamber 382 burn booster charge 384 and gas generating material 386 contained within second thin film vessel 388. As a result, a high density of combustion products including the high temperature and high pressure inflation gas are generated. These combustion products are united with the combustion products generated by burning pyrotechnic charge 366 in second chamber 380.

The combined combustion products pass through fourth circular opening 392. At this time, metal filter 394 disposed across fourth circular opening 392 eliminates specific materials such as minute particles or molten materials from the combustion products originating from the combustion of pyrotechnic charge 366, auxiliary charge 384 and gas generating material 386.

Figure 5:
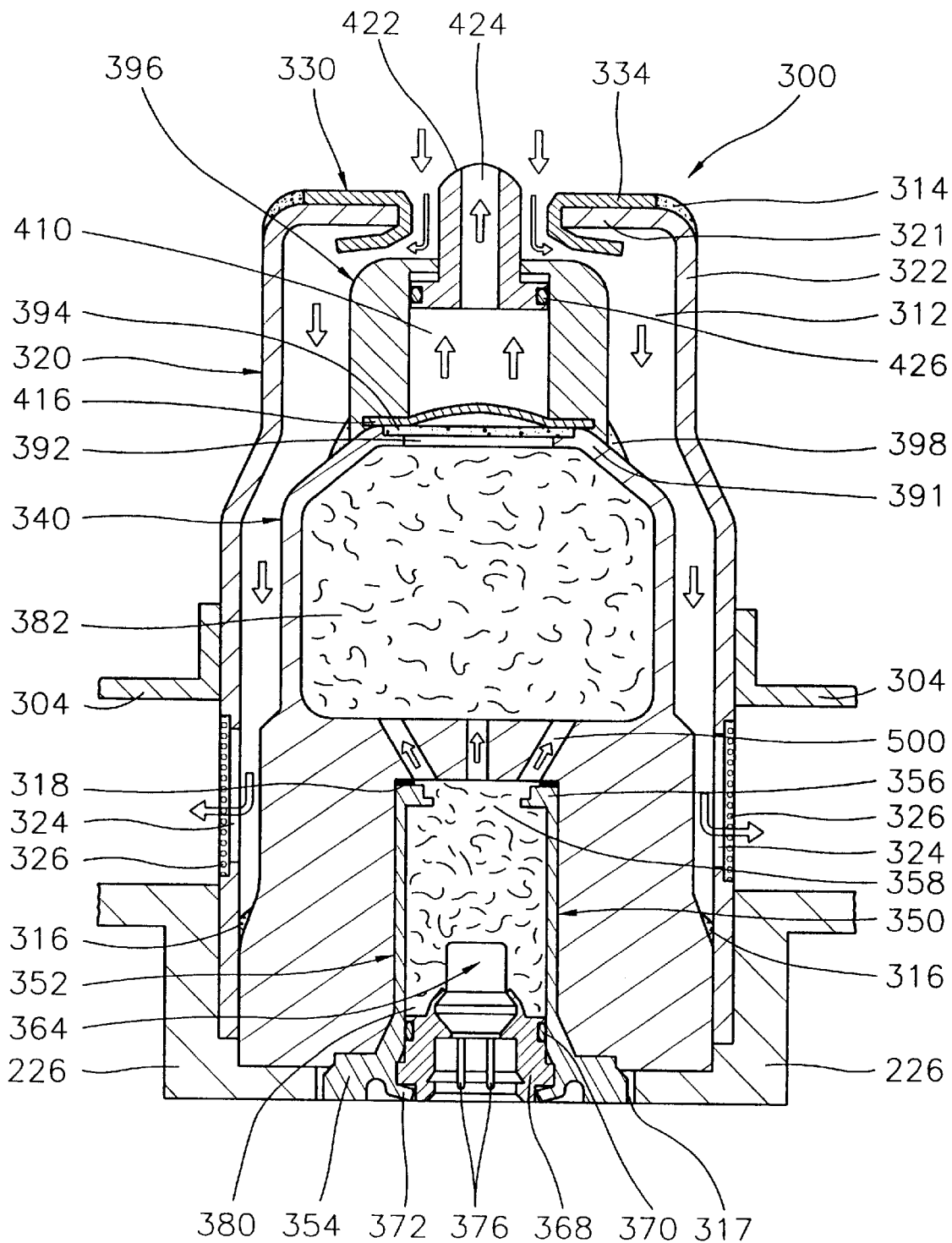
FIG. 5 is a sectional view for showing a state in which the burst disk is ruptured by an operation pin of the hybrid inflator as shown in FIG. 2.

The combustion products which have passed through fourth circular opening 392 simultaneously flow through a plurality of gas flow holes 418 formed at plate spring 412 and push against lower end surface 423 of operation pin 420 elastically supported by plate spring 412. Therefore, operation pin 420 within fourth cylindrical chamber 410 sequentially passes through fifth circular opening 430 and second circular opening 328, and moves from a retracted position shown in FIG. 2 to an extended position shown in FIG. 5.

As operation pin 420 moves, auxiliary disk 432 and disk 330 are ruptured in sequence by sharp tip 422 of operation pin 420. Auxiliary disk 432 prevents an expansion gas from flowing from fourth chamber 410 through fifth circular opening 430 into third internal cavity 312. Disk 330 blocks the pressured gas stored in second container 310 (not shown) from flowing from first chamber 302 through second circular opening 328 into third inner cavity 312 until disk 330 is ruptured by operation pin 420.

When auxiliary disk 432 is ruptured, combustion products pass through through hole 424 of operation pin 420 and enter into third internal cavity 312. Next, when disk 330 is ruptured, part of the combustion products released into third internal cavity 312 flow into first chamber 302, and flow into third internal cavity 312 together with the compressed gas as a result of the flow pressure of compressed gas contained in first chamber 302. At this time, the compressed gas deforms the ruptured disk 330 toward third internal cavity 312 by discharging itself from first chamber 302. As a result, the flow of the compressed gas and the combustion products in the vertical direction is activated.

The compressed gas and combustion products pass through first circular opening 324 via third internal cavity 312. At this time, ceramic filter 326 disposed across first circular opening 324 eliminates specific materials such as minute particles or molten materials from the combustion products and the compressed gas, for a second time in the same way as metal filter 394. The compressed gas and combustion products which have passed through first circular opening 324 are released into second internal cavity 214. As a result, air bag 400 is inflated.

Then, as the compressed gas and combustion products fill air bag 400, air bag 400 penetrates the fragile portion around internal score line 232 of cover 230 so that air bag 400 is expanded toward the front of a passenger in the vehicle. That is, air bag 400 is completely inflated within 0.04 to 0.05 seconds from the moment of sensing the collision by the collision sensor. By doing so, the passenger within the vehicle can be safely protected from the shock that occurs during the collision.

As described above, instead of an operation means for opening flow passages connected air bag 400, hybrid air bag system 200 according to the present invention is provided with operation pin 420 having a simple structure. Therefore, the total internal structure of hybrid inflator 400 is simplified. In addition, the manufacturing cost of hybrid air bag system 200 is reduced.

While the present invention has been particularly shown and described with reference to a particular embodiment thereof, it will be understood by those skilled in the art that various changes in form and details may be effected therein without departing from the spirit and scope of the invention as defined by the appended claims.

What is claimed is:

1. A hybrid air bag system for a motor vehicle, the hybrid air bag system comprising:
    a first container defining a first internal cavity, said first container having a cover which is ruptured at a collision of the motor vehicle and a bottom plate, in which said bottom plate is positioned at a lower inner portion of said cover and is engaged with said cover;
    an inflatable air bag for being unfolded by receiving a compressed gas and combustion products, said inflatable air bag being folded in said first internal cavity, having free ends which are secured between said cover and said bottom plate, and defining a second internal cavity between said bottom plate and said inflatable air bag; and
    a hybrid inflator for generating the combustion products and for inflating said inflatable air bag when a collision sensing signal is generated at the collision of the motor vehicle, said hybrid inflator being mounted on said bottom plate in said second internal cavity and including a second container, said second container having a first steel wall integrally formed to define a first chamber which is filled with the compressed gas and is then sealed.

2. A hybrid air bag system for a motor vehicle as claimed in claim 1, wherein said cover includes an internal score line being easily ruptured by said inflatable air bag at the collision of the motor vehicle and second flanges extending downward from a periphery of said cover.

3. A hybrid air bag system for a motor vehicle as claimed in claim 1, wherein said bottom plate has a planar main body, L-shaped sleeves extending downward from the center of said main body in order to receive said hybrid inflator, first flanges extending downward from both side portions of said main body so that said first flanges correspond with said second flanges, and a plurality of mounting studs for connecting said hybrid air bag system to a structural part of the motor vehicle.

4. A hybrid air bag system for a motor vehicle as claimed in claim 3, wherein said first flanges and said second flanges have rivet holes which are formed through said first flanges and said second flanges respectively and are engaged together with the free ends extending downward between said first flanges and said second flanges by said rivets which go through said rivet holes, wherein said free ends extend downward and are retained by retainer frames.

5. A hybrid air bag system for a motor vehicle as claimed in claim 1, wherein said hybrid inflator comprising:
    a first cylindrical housing defining a third internal cavity and having a second steel wall, in which said second steel wall is welded and engaged to said first steel wall, has a plurality of first circular openings being formed adjacent to a combining position of said first steel wall and said second steel wall, and has a first annular rim extending radially inwardly in order to form a second circular opening at an one end of said first cylindrical housing;
    a burst disk being positioned across said second circular opening and being secured on said first annular rim at a first weld so that a seal is formed at the first weld;
    a second cylindrical housing being positioned within said first cylindrical housing, being welded and engaged to the inner surface of said first cylindrical housing at a second weld so that a seal is formed at the second weld, and including a second annular rim which extend radially inwardly to form a fourth circular opening at an one end of said second cylindrical housing, a third container having a pyrotechnic heater therein, a third chamber having a booster charge and a gas generating material therein, and a plurality of gas flow passages being formed between said third container and said third chamber; and
    a third cylindrical housing defining a fourth chamber and having a third annular rim which extend radially inwardly to form a fifth circular opening at an one end of said third cylindrical housing, and which is mounted on said second cylindrical housing at a fifth weld so that a seal is formed at the fifth weld, in which said fourth chamber includes an operation pin for releasing the compressed gas and the combustion products, and includes a plate spring for elastically supporting said operation pin in said fourth chamber.

6. A hybrid air bag system for a motor vehicle as claimed in claim 5, said hybrid inflator further comprising a ceramic filter disposed across said first circular opening.

7. A hybrid air bag system for a motor vehicle as claimed in claim 5, wherein said burst disk has a dome shaped central portion which is ruptured by said operation pin and a flat annular rim portion which is secured to said first annular rim.

8. A hybrid air bag system for a motor vehicle as claimed in claim 5, said hybrid inflator further comprising a metal filter disposed across said fourth circular opening.

9. A hybrid air bag system for a motor vehicle as claimed in claim 5, wherein said pyrotechnic heater includes an inner end extending radially inwardly to form a third circular opening, an outer end integrally formed with said inner end, a second chamber including a pyrotechnic charge therein, a squib for igniting the pyrotechnic charge, and an adapter for securing said squib.

10. A hybrid air bag system for a motor vehicle as claimed in claim 9, wherein said pyrotechnic heater further includes a metal plug and a first thin metal film disposed across said third circular opening respectively, in which said metal plug is fitted into said inner end, and said first metal thin film is secured on said inner end at a fourth weld so that a seal is formed at the fourth weld.

11. A hybrid air bag system for a motor vehicle as claimed in claim 9, wherein said pyrotechnic heater further includes a first combustible thin film vessel enclosing the pyrotechnic charge in said second chamber, said squib has electrically conductive pins for receiving an electric current from an outside current supply source, said adapter has a first O-shaped sealing ring for sealing said adapter, and said outer end is welded and engaged to said L-shaped sleeve at a third weld so that a seal is formed at the third weld.

12. A hybrid air bag system for a motor vehicle as claimed in claim 11, wherein said first thin film vessel is made of aluminum or steel.

13. A hybrid air bag system for a motor vehicle as claimed in claim 5, wherein said hybrid inflator further includes a second combustible thin film vessel enclosing the booster charge and the gas generating material in said third chamber, and a second thin metal diaphragm disposed in said second thin film vessel in order to isolate the booster charge from the gas generating material.

14. A hybrid air bag system for a motor vehicle as claimed in claim 13, wherein said second thin film vessel is made of aluminum or steel.

15. A hybrid air bag system for a motor vehicle as claimed in claim 5, wherein said gas flow passages allow fluid communication of said second chamber with said third chamber.

16. A hybrid air bag system for a motor vehicle as claimed in claim 5, said hybrid inflator further comprising an auxiliary disk disposed across said fifth circular opening, and said third cylindrical housing being welded to said second cylindrical housing at a fifth weld so that a seal is formed at the fifth weld.

17. A hybrid air bag system for a motor vehicle as claimed in claim 5, wherein said operation pin has a sharp tip, a through hole formed through the center of said operation pin, a lower end surface, and a second O-shaped sealing ring, and wherein said operation pin moves upwardly by the pressure of the combustion products and ruptures said auxiliary disk and said disk in sequence when the combustion products are generated by burning the pyrotechnic charge, the booster charge, and the gas generating material.

18. A hybrid air bag system for a motor vehicle as claimed in claim 5, wherein said plate spring includes a dome shaped central portion which has a plurality of gas flow holes and a flat annular rim portion which is secured to said second annular rim.

19. A hybrid air bag system for a motor vehicle as claimed in claim 1, wherein the compressed gas is a gas selected from the group consisting of an inert gas, an inflammable fuel gas and an oxidizer gas.

20. A hybrid air bag system for a motor vehicle as claimed in claim 19, wherein the inert gas is a gas selected from the group consisting of nitrogen, argon, and a mixture of nitrogen and argon.

21. A hybrid air bag system for a motor vehicle, the hybrid air bag system comprising:

(a) a first container defining a first internal cavity, said first container having a cover which is ruptured at a collision of the motor vehicle and a bottom plate, in which said bottom plate is positioned at the lower inner portion of said cover and is engaged with said cover, said cover includes an internal score line being easily ruptured at the collision of the motor vehicle and second flanges extending downward from a periphery of said cover, said bottom plate has a planar main body, L-shaped sleeves extending downward from the center of said main body, first flanges extending downward from both side portions of said main body so that said first flanges correspond with said second flanges, and a plurality of mounting studs for connecting said first container to a structural part of the motor vehicle, said first flanges and said second flanges have rivet holes which are formed through said first flanges and said second flanges respectively, and said first flanges and second flanges are engaged together by said rivets which go through said rivet holes, (b) an inflatable air bag for being unfolded by receiving a compressed gas and combustion products, said inflatable air bag being folded in said first internal cavity, having free ends which are secured between said cover and said bottom plate, and defining a second internal cavity between said bottom plate and said inflatable air bag, wherein the compressed gas is a gas selected from the group consisting of an inert gas, an inflammable fuel gas and an oxidizer gas, and said free ends extend downward between said first flanges and said second flanges and are retained by retainer frames;

(c) a hybrid inflator for generating the combustion products and for inflating said inflatable air bag when a collision sensing signal is generated at the collision of the motor vehicle, said hybrid inflator being mounted on said bottom plate in said second internal cavity and including a second container, said second container having a first steel wall integrally formed to define a first chamber which is filled with the compressed gas and is then sealed, wherein said hybrid inflator comprising:

a first cylindrical housing defining a third internal cavity and having a second steel wall, in which said second steel wall is welded and engaged to said first steel wall, has a plurality of first circular openings being formed adjacent to a combining position of said first steel wall and said second steel wall, and has a first annular rim extending radially inwardly in order to form a second circular opening at an one end of said first cylindrical housing;

a burst disk being positioned across said second circular opening and being secured on said first annular rim at a first weld so that a seal is formed at the first weld, said burst disk having a dome shaped central portion and a flat annular rim portion which is secured to said first annular rim;

a second cylindrical housing being positioned within said first cylindrical housing, being welded and engaged to the inner surface of said first cylindrical housing at a second weld so that a seal is formed at the second weld, and including a second annular rim which extend radially inwardly to form a fourth circular opening at an one end of said second cylindrical housing, a third container having a pyrotechnic heater therein, a third chamber having a booster charge and a gas generating material therein, and a plurality of gas flow passages being formed between said third container and said third chamber;

a third cylindrical housing defining a fourth chamber and having a third annular rim which extend radially inwardly to form a fifth circular opening at an one end of said third cylindrical housing, and said third cylindrical housing being mounted on said second cylindrical housing at a fifth weld so that a seal is formed at the fifth weld, wherein said fourth chamber includes an operation pin for releasing the compressed gas and the combustion products, and includes a plate spring for elastically supporting said operation pin in said fourth chamber;

a ceramic filter disposed across said first circular opening;

a metal filter disposed across said fourth circular opening;

a second combustible thin film vessel enclosing the booster charge and the gas generating material in said third chamber, said second thin film vessel being made of aluminum or steel;

a second thin metal diaphragm disposed in said second thin film vessel in order to isolate the booster charge from the gas generating material; and an auxiliary disk disposed across said fifth circular opening.

22. A hybrid air bag system for a motor vehicle as claimed in claim 21, wherein said pyrotechnic heater includes an inner end extending radially inwardly to form a third circular opening, an outer end integrally formed with said inner end, a second chamber including a pyrotechnic charge therein, a squib for igniting the pyrotechnic charge, an adapter for securing said squib, a metal plug and a first thin metal film disposed across said third circular opening respectively, and a first combustible thin film vessel enclosing the pyrotechnic charge in said second chamber.

23. A hybrid air bag system for a motor vehicle as claimed in claim 22, wherein said outer end is welded and engaged to said L-shaped sleeve at a third weld so that a seal is formed at the third weld, said squib has electrically conductive pins for receiving an electric current from an outside current supply source, said adapter has a first O-shaped sealing ring for sealing said adapter, said metal plug is fitted into said inner end, said first metal thin film is secured on said inner end at a fourth weld so that a seal is formed at the fourth weld, and said first thin film vessel is made of aluminum or steel.

24. A hybrid air bag system for a motor vehicle as claimed in claim 21, wherein said gas flow passages allow fluid communication of said second chamber with said third chamber.

25. A hybrid air bag system for a motor vehicle as claimed in claim 21, wherein said operation pin has a sharp tip, a through hole formed through the center of said operation pin, a lower end surface, and a second O-shaped sealing ring, and wherein said operation pin moves upwardly by the pressure of the combustion products and ruptures said auxiliary disk and said disk in sequence when the combustion products are generated by burning the pyrotechnic charge, the booster charge, and the gas generating material.

26. A hybrid air bag system for a motor vehicle as claimed in claim 21, wherein said plate spring includes a dome shaped central portion which has a plurality of gas flow holes and a flat annular rim portion which is secured to said second annular rim.

27. A hybrid air bag system for a motor vehicle as claimed in claim 21, wherein the inert gas is a gas selected from the group consisting of nitrogen, argon, and a mixture of nitrogen and argon.

28. A hybrid air bag system for a motor vehicle, the hybrid air bag system comprising:

(a) a first container defining a first internal cavity, said first container having a cover which is ruptured at a collision of the motor vehicle and a bottom plate, in which said bottom plate is positioned at the lower inner portion of said cover and is engaged with said cover, said cover includes an internal score line being easily ruptured at the collision of the motor vehicle and second flanges extending downward from a periphery of said cover, said bottom plate has a planar main body, L-shaped sleeves extending downward from the center of said main body, first flanges extending downward from both side portions of said main body so that said first flanges correspond with said second flanges, and a plurality of mounting studs for connecting said first container to a structural part of the motor vehicle, said first flanges and said second flanges have rivet holes which are formed through said first flanges and said second flanges respectively, and said first flanges and second flanges are engaged together by said rivets which go through said rivet holes;

(b) an inflatable air bag for being unfolded by receiving a compressed gas and combustion products, said inflatable air bag being folded in said first internal cavity, having free ends which are secured between said cover and said bottom plate, and defining a second internal cavity between said bottom plate and said inflatable air bag, wherein the compressed gas is a gas selected from the group consisting of an inert gas, an inflammable fuel gas and an oxidizer gas, and said free ends extend downward between said first flanges and said second flanges and are retained by retainer frames;

(c) a hybrid inflator for generating the combustion products and for inflating said inflatable air bag when a collision sensing signal is generated at the collision of the motor vehicle, said hybrid inflator being mounted on said bottom plate in said second internal cavity and including a second container, said second container having a first steel wall integrally formed to define a first chamber which is filled with the compressed gas and is then sealed, wherein said hybrid inflator comprising:

a first cylindrical housing defining a third internal cavity and having a second steel wall, in which said second steel wall is welded and engaged to said first steel wall, has a plurality of first circular openings being formed adjacent to a combining position of said first steel wall and said second steel wall, and has a first annular rim extending radially inwardly in order to form a second circular opening at an one end of said first cylindrical housing;

a burst disk being positioned across said second circular opening and being secured on said first annular rim at a first weld so that a seal is formed at the first weld, said burst disk having a dome shaped central portion and a flat annular rim portion which is secured to said first annular rim:

a second cylindrical housing being positioned within said first cylindrical housing, being welded and engaged to the inner surface of said first cylindrical housing at a second weld so that a seal is formed at the second weld, and including a second annular rim which extend radially inwardly to form a fourth circular opening at an one end of said second cylindrical housing, a third container having a pyrotechnic heater therein, a third chamber having a booster charge and a gas generating material therein, a plurality of gas flow passages being formed between said third container and said third chamber, said pyrotechnic heater includes an inner end extending radially inwardly to form a third circular opening, an outer end integrally formed with said inner end, a second chamber including a pyrotechnic charge therein, a squib for igniting the pyrotechnic charge, an adapter for securing said squib, a metal plug and a first thin metal film disposed across said third circular opening respectively, and a first combustible thin film vessel enclosing the pyrotechnic charge in said second chamber, said outer end is welded and engaged to said L-shaped sleeve at a third weld so that a seal is formed at the third weld, said squib has electrically conductive pins for receiving an electric current from an outside current supply source, said adapter has a first O-shaped sealing ring for sealing said adapter, said metal plug is fitted into said inner end, said first metal thin film is secured on said inner end at a fourth weld so that a seal is formed at the fourth weld, and said first thin film vessel is made of aluminum or steel;

a third cylindrical housing defining a fourth chamber and having a third annular rim which extend radially inwardly to form a fifth circular opening at an one end of said third cylindrical housing, and said third cylindrical housing being mounted on said second cylindrical housing at a fifth weld so that a seal is formed at the fifth weld, wherein said fourth chamber includes an operation pin for releasing the compressed gas and the combustion products, and includes a plate spring for elastically supporting said operation pin in said fourth chamber, said operation pin has a sharp tip, a through hole formed through the center of said operation pin, a lower end surface, and a second O-shaped sealing ring, and wherein said operation pin moves upwardly by the pressure of the combustion products and ruptures said auxiliary disk and said disk in sequence when the combustion products are generated by burning the pyrotechnic charge, the booster charge, and the gas generating material, said plate spring includes a dome shaped central portion which has a plurality of gas flow holes and a flat annular rim portion which is secured to said second annular rim;

a ceramic filter disposed across said first circular opening;

a metal filter disposed across said fourth circular opening;

a second combustible thin film vessel enclosing the booster charge and the gas generating material in said third chamber, said second thin film vessel being made of aluminum or steel;

a second thin metal diaphragm disposed in said second thin film vessel in order to isolate the booster charge from the gas generating material; and an auxiliary disk disposed across said fifth circular opening.

29. A hybrid air bag system for a motor vehicle as claimed in claim 28, wherein said gas flow passages allow fluid communication of said second chamber with said third chamber.

30. A hybrid air bag system for a motor vehicle as claimed in claim 28, wherein the inert gas is a gas selected from the group consisting of nitrogen argon, and a mixture of nitrogen and argon.

* * * * *